United States Patent Office 3,773,750
Patented Nov. 20, 1973

3,773,750
2,6-DIHALO - 4 - NITROPHENYL-AZO-PHENYL COMPOUNDS HAVING AN OPTIONALLY SUBSTITUTED PHENYLCARBAMOYLOXYALKYL SUBSTITUENT
Wolfgang Groebke, Oberwil, Basel-Land, and Roswitha Wirz, Liestal, Basel-Land, Switzerland, assignors to Sandoz Ltd., Basel, Switzerland
No Drawing. Filed Jan. 18, 1971, Ser. No. 107,490
Claims priority, application Switzerland, Feb. 2, 1970, 1,423/70
Int. Cl. C07c 107/06; C09b 29/08
U.S. Cl. 260—207.1     8 Claims

ABSTRACT OF THE DISCLOSURE

Azo compounds of the formula

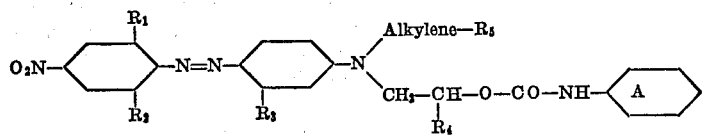

wherein
each of $R_1$ and $R_2$ is chlorine or bromine,
each of $R_3$ and $R_4$ is hydrogen or methyl,
$R_5$ is hydrogen or cyano
and the nucleus A may bear substituents, but no $SO_3H$ group, are disperse dyes suitable, e.g., for dyeing polyester fibers. The dyeings are fast to light, water and solvents.

---

This invention relates to 2,6-dihalogeno - 4 - nitro-4'-amino-1,1'-azobenzene compounds, the amino group of which is substituted by a phenylaminocarbonyloxyalkyl group, and which are highly suitable for use as disperse dyes. Applied to substrates consisting of synthetic or semi-synthetic organic materials of hydrophobic character, they give dyeings notable for their good fastness to light, water and solvents.

The new compounds have the formula

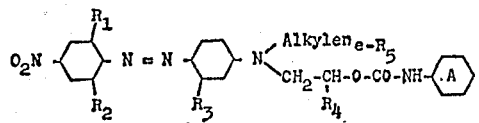

where
$R_1$ and $R_2$, independently of each other, stand for chlorine or bromine atoms,
$R_3$ and $R_4$, independently of each other, for hydrogen atoms or methyl groups, and
$R_5$ for a hydrogen atom or a cyano group, and where the benzene nucleus A may bear further substituents, with the exception of sulphonic acid groups.

Examples of suitable substituents on the nucleus A are halogen atoms, alkyl, alkoxy, acyl, acylamino, acyloxy, nitro and cyano groups. Chlorine and bromine atoms are the preferred halogen atoms. The alkyl and alkoxy groups may be further substituted, generally they contain 1, 2, 3 or 4 carbon atoms. The alkylene group in Formula I contains preferably 1 to 4 carbon atoms.

The preferred acyl groups correspond to the formula

R—Y— or R'—Z—, where
R stands for a hydrocarbon radical which may bear the aforenamed substituents and/or hetero atoms, preferably for an alkyl or phenyl radical which may bear substituents, Y for a radical —O—CO— or —SO$_2$—,
R' for a hydrogen atom or R,
Z for a radical —CO—, —NR"CO— or —NR"SO$_2$—
and
R" for a hydrogen atom or R.

The process for the production of the new compounds comprises diazotization of an amine of the formula

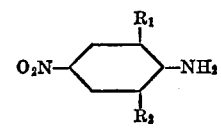

following by coupling of the diazonium compound with a compound of the formula

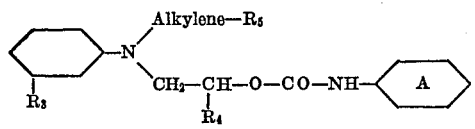

The coupling reaction is normally carried out in an acid medium, which, if necessary, is buffered, with cooling.

The compounds of Formula III are produced in known manner (in analogy with the method described in British Pat. 845,220) by reacting 1 mole of a compound of the formula

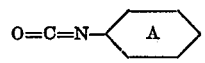

with 1 mole of a tertiary amine of the formula

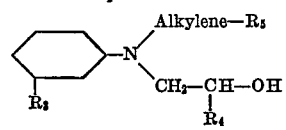

In analogy with this method the dyes of Formula I can also be produced by reacting 1 mole of a compound of Formula IV with 1 mole of an azo compound of the formula

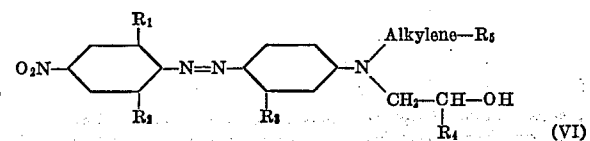

It is preferable to carry out these addition reactions in an inert, aprotic organic solvent, such as benzene, toluene, xylene, nitrobenzene, chlorobenzene, acetone, dioxan or dimethyl formamide, at temperatures in the range of about 70° C. to 180° C.

Alternatively, the dyes of Formula I can be formed by the condensation of 1 mole of a compound of the formula

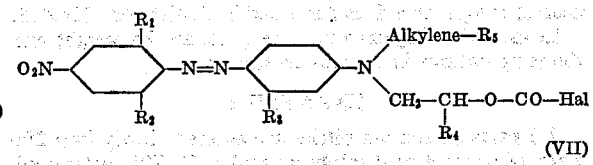

where Hal represents a chlorine or bromine atom, with 1 mole of an amine of the formula

or again by the condensation of 1 mole of a compound of Formula VI with 1 mole of a compound of the formula

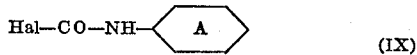

where Hal represents a chlorine or bromine atom.

These condensation reactions are generally carried out in an inert solvent, e.g. one of those named above, at temperatures up to about 130° C. and preferably in the presence of an acid-binding agent, such as an alkali carbonate, bicarbonate or acetate, magnesium oxide or pyridine.

Of the dyes of Formula I, preference is given to those in which the benzene nucleus A is not substituted or contains as substituent a methyl or methoxy group. Of these dyes, those are especially preferred in which $R_5$ represents hydrogen and the alkylene radical bears 1, 2, 3 or 4, or more especially 2, carbon atoms.

The new compounds of Formula I are processed by known methods, for example, by grinding in the presence of dispersing agents and/or fillers, to obtain commercial dyeing preparations. The resulting pastes are dried in a vacuum or injection drier if powder preparations are desired. After being dispersed in a suitable volume of water, the new dyes can be applied by exhaust dyeing, pad dyeing or printing methods at a long or short liquor-to-goods ratio.

From aqueous dispersion the dyes build up powerfully on textiles made of synthetic or semi-synthetic, high molecular-weight organic materials of hydrophobic character, giving dyeings and prints of the full depth. They are especially suitable for dyeing and printing polyesters, cellulose acetate, cellulose triacetate and synthetic polyamide fibres in the various textile forms. They are also dyeable on polyolefins. The known dyeing and printing methods are employed, for instance the process described in British Pat. 1,114,433.

The dyeings and prints show excellent colour fastness in a comprehensive range of properties, the fastness to light and to dry and wet heat (thermofixation, sublimation, steaming, pleating) being outstanding. They are very fast to wet treatments, including water, sea water, washing, perspiration, solvents, and in particular dry cleaning, and to lubricants, rubbing, cross dyeing, ozone, gas fumes and chlorine. They are stable to the pre-cure and post-cure permanent press finishing processes and to soil release finishes. Other good features are the dischargeability, the stability to reduction (in dyeing with wool), and the reserve of wool, cotton, viscose and silk. On direct exposure to light over a long period of time the originally bright dyeings fade tone-in-tone.

In the dyeing of polyester textiles at room temperature, for which carriers are used, the dyes of this invention are adsorbed in approximately equal amounts on set fibre and on fibre that has not been previously set. Goods which have been set under conditions producing variations in the degree of setting are therefore dyed to uniform depth. Applied to polyester textiles under high temperature conditions, the dyes are unaffected by variations in the bath pH between pH 5 and 9. The stability of the dispersions in long dyeing times at high temperature is fully satisfactory. On polyester fibres the dyes of the present invention show better wash fastness than the nearest comparable dyes described in British Pat. 824,443.

In the following examples the parts are by weight and the temperatures in degrees centigrade.

EXAMPLE 1

7.5 parts of sodium nitrite are entered slowly into 200 parts of concentrated sulphuric acid at 65–70°. After cooling to 15°, 20.7 parts of 2,6-dichloro-4-nitro-1-aminobenzene are added. The amine is diazotized for 3 hours at 10–15°, then the dark solution is run with stirring into a mixture of 350 parts of ice and 160 parts of water. After excess sodium nitrite has been decomposed with 2 parts of aminosulphonic acid, the diazo solution is filtered clear from a small amount of residual matter. A solution of 28.4 parts of the phenylcarbamic acid ester of N-ethyl-N-(2'-hydroxyethyl)-aminobenzene in a mixture of 60 parts of glacial acetic acid and 36 parts of concentrated hydrochloric acid is allowed to flow into the clarified diazo solution at 0–3°. The coupling reaction is brought to an end by the addition of a solution of 130 parts of crystallized sodium acetate in 200 parts of water. The red-brown dye is filtered and dried. It dyes polyester fibres in brown shades which are very fast to thermofixation.

In relation to the next comparable dye which is disclosed in British Pat. 824,443, the polyester dyeing of this dye is faster to light, washing and lubricants. In comparison with the nearest comparable dye described in the published Japanese patent application No. 3,009/67, the above dye produced in accordance with this invention has higher affinity for polyester fibres and better fastness to lubricants on these fibres, along with better wash fastness on cellulose triacetate.

EXAMPLE 2

A diazonium salt solution is prepared as given in the foregoing example. 100 parts of urea are added, followed at 0–3° by a solution of 29.8 parts of the phenylcarbamic acid ester of 1-N-ethyl-N-(2'-hydroxyethyl)-3-methyl-aminobenzene in 100 parts of glacial acetic acid. After 2 hours the brown dye formed is filtered and dried. It gives brown-red dyeings on polyester fabrics which are fast to thermofixation. Compared with the nearest comparable dye of British Pat. 824,443, it is faster to light, washing and lubricants on polyester fibres.

EXAMPLE 3

At 65–70° 7.5 parts of sodium nitrite are entered slowly into 200 parts of concentrated sulphuric acid. After cooling to 15°, 29.6 parts of 2,6-dibromo-4-nitro-1-aminobenzene are added. The amine is diazotized for 3 hours at 10–15°, then the dark solution is added with stirring to a mixture of 350 parts of ice and 160 parts of water. The excess sodium nitrite is decomposed with 2 parts of aminosulphonic acid and the diazo solution filtered free from a small amount of residue. A solution of 16.5 parts of N-ethyl-N-(2'-hydroxyethyl)-aminobenzene in 40 parts of glacial acetic acid is allowed to flow into the clarified diazo solution at 0–3°. Coupling is completed by the addition of 130 parts of sodium acetate in 200 parts of water. The red-brown dye is filtered, washed and dried.

47.2 parts of the dry dye are dissolved in 70 parts of anhydrous dioxan and 14.3 parts of phenyl isocyanate are slowly added to the solution. The mixture is reacted at the boil for 24 hours with reflux. On cooling to 50°, it is diluted with 70 parts of methyl alcohol and allowed to run very slowly with good stirring into a mixture of 100 parts of water and 7 parts of concentrated hydrochloric acid. After 3 hours the dye, having settled out, is filtered, washed free of acid and dried. It dyes polyester fibres in brown shades showing high thermofixation fastness.

EXAMPLE 4

38.3 parts of dry 2,6 - dichloro-4-nitro-4'-[N-ethyl-N-(2''-hydroxy-ethyl)-amino]-1,1'-azobenzene (prepared by diazotization of 2,6-dichloro-4-nitro-1-aminobenzene and coupling with N-ethyl-N-(2'-hydroxyethyl) - aminobenzene) are dissolved in 120 parts of toluene. After the dropwise addition of 14.3 parts of phenyl isocyanate the mixture is reacted for 12 hours at the boil with reflux, after which the excess toluene is removed by evaporation in vacuum. As the concentrated solution cools, the dye settles out in crystalline form. It is isolated by filtration and dried. The dye of this example is identical with that of Example 1.

EXAMPLE 5

44.2 parts of 2-chloro-6-bromo-4-nitro-4'-[N-ethyl-N-(2''-hydroxyethyl)-amino] - 2' - methyl-1,1'-azobenzene (produced by diazotization of 2-chloro-6-bromo-4-nitro-1-aminobenzene and coupling with 1-N-ethyl-N-(2'-hydroxyethyl)-3-methylaminobenzene) are dissolved in 100 parts of dimethyl formamide. 14.3 parts of phenyl isocyanate are added to the solution with stirring. After 3 hours at 100° the reaction is complete. The cooled reaction mixture is run into 200 parts of water to precipitate the dye, which is isolated by filtration, washed and dried. On polyester fibres it gives brown-red dyeings which are fast to thermofixation.

Table 1 below specifies further dyes conforming to the present invention which are of the formula

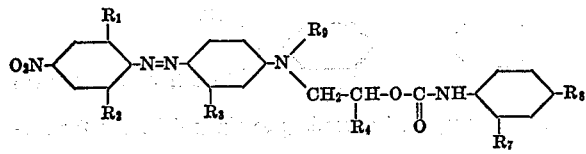

The dyeings obtained on polyester fibres with these dyes range in shade from yellow-brown to brown-red.

TABLE 1

| Example number | $R_1$ | $R_2$ | $R_3$ | $R_4$ | $R_7$ | $R_8$ | $R_9$ |
|---|---|---|---|---|---|---|---|
| 6  | Cl | Cl | H   | H   | H    | H   | —CH$_2$—CH$_2$—CN |
| 7  | Cl | Cl | H   | CH$_3$ | H | H   | —CH$_2$—CH$_3$ |
| 8  | Cl | Cl | CH$_3$ | H | H  | H   | —CH$_2$—CH$_2$—CN |
| 9  | Cl | Cl | H   | H   | H    | H   | —CH$_3$ |
| 10 | Cl | Cl | H   | H   | H    | H   | —CH$_2$—CH$_2$—CH$_3$ |
| 11 | Cl | Cl | CH$_3$ | H | H  | H   | —CH$_2$CH$_2$—CH$_2$—CH$_3$ |
| 12 | Cl | Cl | H   | H   | H    | H   | —CH$_2$—CH—CN<br>    \|<br>    CH$_3$ |
| 13 | Cl | Cl | CH$_3$ | H | H  | OCH$_3$ | —CH$_3$ |
| 14 | Cl | Cl | CH$_3$ | H | CH$_3$ | H | —CH$_2$—CH$_3$ |
| 15 | Br | Br | H   | CH$_3$ | H | H   | —CH$_2$—CH$_3$ |
| 16 | Br | Br | H   | H   | H    | H   | —CH$_2$—CH$_2$—CH$_3$ |
| 17 | Br | Br | H   | CH$_3$ | H | H   | —CH$_2$—CH$_3$ |
| 18 | Br | Br | CH$_3$ | H | H  | H   | —CH$_3$ |
| 19 | Br | Br | H   | H   | H    | CH$_3$ | —CH$_3$ |
| 20 | Br | Br | H   | H   | H    | H   | —CH$_2$—CH$_2$—CH$_2$—CH$_3$ |
| 21 | Br | Br | CH$_3$ | H | H  | H   | —CH$_2$—CH$_3$ |
| 22 | Br | Br | H   | H   | OCH$_3$ | H | —CH$_2$—CH$_2$—CN |
| 23 | Cl | Br | H   | H   | H    | H   | —CH$_2$—CH$_2$—CH$_2$—CH$_3$ |
| 24 | Cl | Br | CH$_3$ | H | H  | H   | —CH$_2$—CH$_2$—CH$_3$ |
| 25 | Cl | Br | H   | H   | H    | H   | —CH$_2$—CH—CN<br>    \|<br>    CH$_3$ |

Application examples (A) A mixture of 4 parts of the dye produced as in Example 1, 6 parts of sodium ligninsulphonate and 100 parts of water is ground in a ball mill and the resulting paste dried in an injection drier. With 3 parts of the dry paste and 3000 parts of water at 40–50° a dyebath is prepared, into which 100 parts of a scoured polyester fabric are entered. The bath is raised slowly to 130° and the fabric dyed for about 1 hour at this temperature under static pressure. On removal it is rinsed, soaped, rinsed again and dried. A level red-brown dyeing of good depth is obtained which has excellent fastness to light, washing, water, sea water, perspiration, sublimation, thermofixation, pleating, cross dyeing, solvents, gas fumes and rubbing. The dyeing is stable to pre-cure and post-cure permanent press finishing and to soil release finishes.

(B) A fine aqueous dispersion is prepared with 8 parts of the dye produced as in Example 1, 6 parts of sodium dinaphthylmethane-disulphonate, 6 parts of sodium ligninsulphonate and 3 parts of sodium alginate. The dispersion is made up to 1000 parts with water and well stirred to give a padding liquor. A polyester fabric is padded with the liquor at 25°, dried in dry air at 100–130° and exposed to dry heat at 230° for fixation of the dyeing. Subsequently the fabric is rinsed, soaped, rinsed again and dried. A red-brown dyeing is obtained with the good fastness properties enumerated in Application Example A.

(C) A mixture of 25 parts of the dye produced according to Example 2, 55 parts of sodium liginsulphonate and 800 parts of water is ground in a ball mill until the dye particles are smaller than 1 micron in size. The colloidal solution thus formed is mixed with 25 parts of 2-n-butoxy-ethanol and 400 parts of 10% sodium alginate solution to give a printing paste. This paste is very suitable for printing woven and knitted polyester fabrics on machines with two rollers. Without intermediate drying, the prints are steamed at 120° for fixation. Prints of red-brown shade with good fastness properties are obtained.

Formulae of representative dyestuffs of the foregoing examples are as follows:

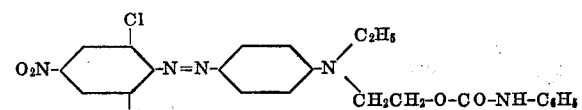

Examples 1 and 4

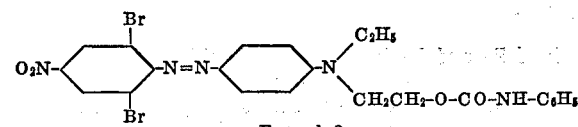

Example 3

Example 2 and

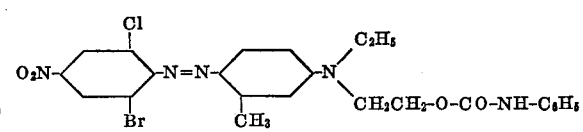

Example 5

Having thus disclosed the invention what we claim is:
1. A compound of the formula

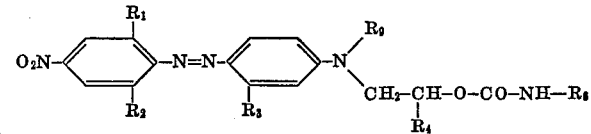

wherein each of $R_1$ and $R_2$ is independently chloro or bromo,
each of $R_3$ and $R_4$ is independently hydrogen or methyl,
$R_6$ is phenyl or substituted phenyl, wherein each substituent or substituted phenyl is independently chloro, bromo, alkyl, alkoxy, acyl, acylamino, acyloxy, nitro or cyano,
  wherein each acyl, acyl radical of acylamino and acyl radical of acyloxy is independently R—Y— or R'—Z—, wherein R is alkyl or phenyl, Y is —O—CO— or —SO$_2$—,
  R' is hydrogen or R, and Z is —CO—, —NR'—CO— or —NR'—SO$_2$—, and
  each alkyl and alkoxy independently has 1, 2, 3 or 4 carbon atoms, and
R$_9$ is alkyl of 1 to 4 carbon atoms or cyanoalkyl wherein the alkyl radical has 1 to 4 carbon atoms.

2. A compound according to claim 1 having the formula

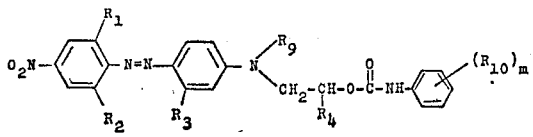

wherein each of R$_1$ and R$_2$ is independently chloro or bromo,
each of R$_3$ and R$_4$ is independently hydrogen or methyl,
R$_9$ is alkyl of 1 to 4 carbon atoms or cyanoalkyl wherein the alkyl radical has 1 to 4 carbon atoms,
R$_{10}$ is methyl or methoxy, and
m is 0 or 1.

3. A compound according to claim 2 wherein R$_9$ is alkyl of 1 to 4 carbon atoms.

4. A compound according to claim 3 having the formula

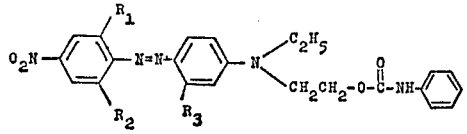

wherein each of R$_1$ and R$_2$ is independently chloro or bromo, and R$_3$ is hydrogen or methyl.

5. The compound according to claim 4 having the formula

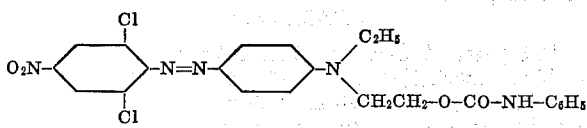

6. The compound according to claim 4 having the formula

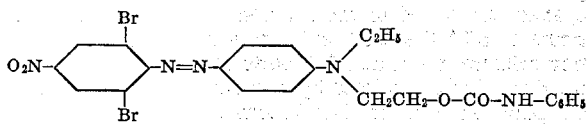

7. The compound according to claim 4 having the formula

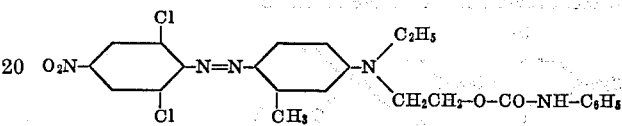

8. The compound according to claim 4 having the formula

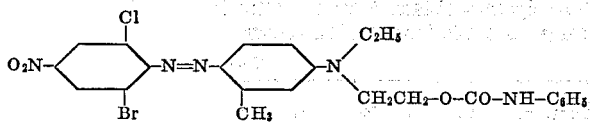

References Cited
FOREIGN PATENTS

| | | | |
|---|---|---|---|
| 3,009 | 8/1967 | Japan | 260—207.1 |
| 824,443 | 12/1959 | Great Britain | 260—207.1 |
| 5,672 | 3/1968 | Japan | 260—207.1 |

LEWIS GOTTS, Primary Examiner

C. F. WARREN, Assistant Examiner

U.S. Cl. X.R.

8—41 C